Patented July 31, 1945

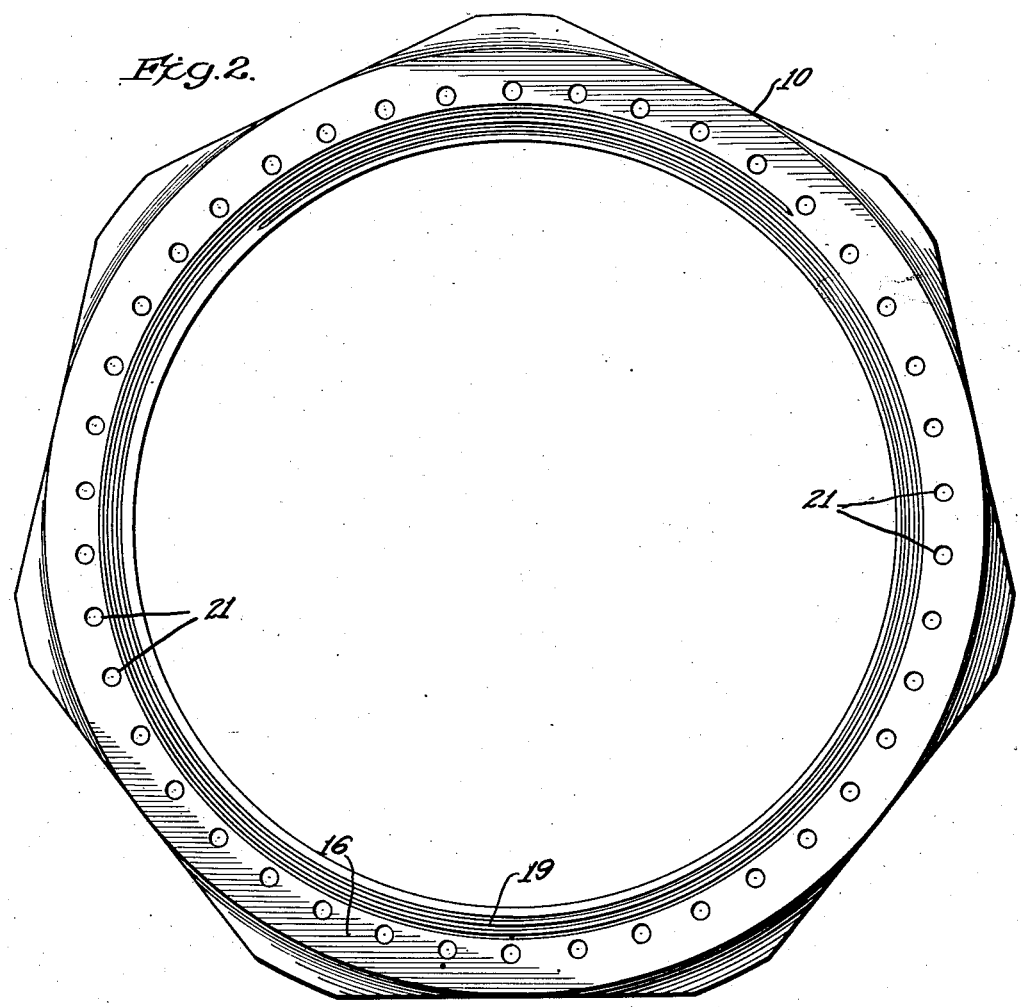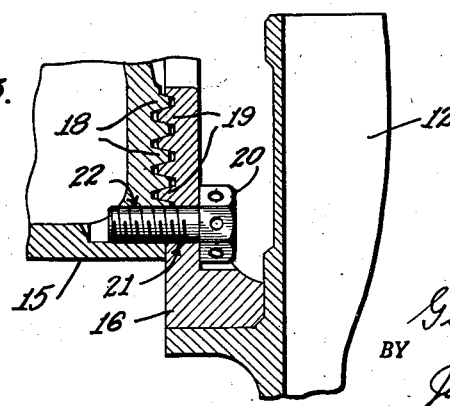

2,380,684

UNITED STATES PATENT OFFICE 2,380,684

ATTACHMENT JOINT

Gilmoure N. Cole, Manchester, Conn., assignor to United Aircraft Corporation, East Hartford, Conn., a corporation of Delaware Application November 10, 1944, Serial No. 562,849

7 Claims. (Cl. 308—23)

This invention relates to internal combustion engines and has for its object to provide a novel and improved crankcase construction for engines of this type.

Another object of the invention is to provide a crankcase for internal combustion engines having a novel and improved joint between the shell of the crankcase and the end sections or webs supporting the crankshaft bearings, whereby the explosion loads imposed by the engine cylinders are largely taken up by the said joint and their effect on the crankcase shell is thereby minimized.

Still another object is to provide a crankcase assembly including a joint of the foregoing type which is easily and quickly adjusted to obtain the required fit between the main shell of the crankcase and the end sections supporting the crankshaft bearings.

Various other objects and advantages will be apparent as the nature of the invention is more fully disclosed.

For purposes of illustration the invention will be described in its application to a combustion engine in which the cylinder attachment portion of the crankcase comprises an integral substantially cylindrical shell built up from welded steel, mounting two banks of cylinders without any joint in the cylindrical shell on the center lines of the banks of cylinders. In such a construction, it is necessary that the front and rear diaphragms be removable from the crankcase shell in order to assemble the master rod cluster on the crankshaft.

According to the present invention, this is accomplished by providing a flat spiral thread, disposed in a plane normal to the crankshaft, between the end face of the shell and the crankshaft bearing supporting web. By "flat spiral" is meant a spiral whose convolutions are all in the same plane. A series of circumferentially spaced screws hold the web to the shell and absorb axial separating forces. Radial forces, such as from the explosion loads, are taken up in shear by the spiral thread. This construction has an advantage over concentric lands and grooves in that the tolerances between the threads may be greater with the desired radial fit between the mating threads being accomplished by turning the web with respect to the shell. Thus, if the web is turned with respect to the shell, by an amount equal to the distance between two adjacent screw holes, the fit between the threads will be changed by an amount equal to the pitch of the thread divided by the number of holes.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Fig. 2 is a transverse section taken on the line 2—2 of Fig. 1; and

Fig. 3 is a fragmentary sectional view, on an enlarged scale, corresponding with the lower portion of Fig. 1.

Figure 1:
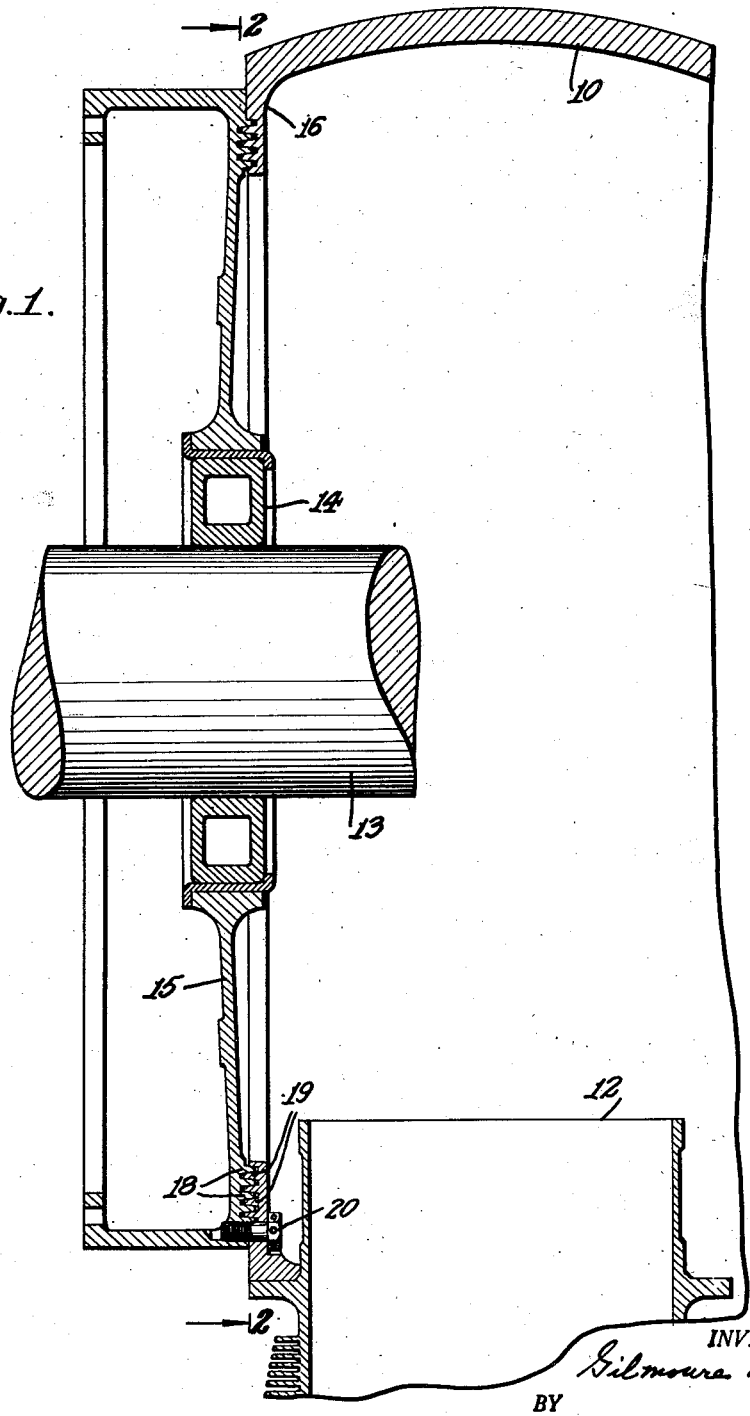
Figure 1 is a vertical sectional view through an engine crankcase embodying the present invention.

In the following description certain specific terms are used for convenience in referring to the various details of the invention. These terms, however, are to be interpreted as broadly as the state of the art will permit.

In the drawings, Fig. 1 shows schematically the cylindrical welded steel shell 10 of an engine crankcase, having banks of cylinders 12, and a crankshaft 13 which is journaled in bearing 14 mounted in the removable end section or web 15 of circular cross-section. The shell 10 of the crankcase has an annular end wall or flange 16 to which the web 15 is adjustably secured, as will now be described.

The adjacent faces of web 15 and of crankcase flange 16 contain cooperating, intermeshing flat spiral threads 18 and 19, disposed in a plane normal to the crankshaft 13. The web 15 is secured to the flange 16 of the crankcase by a series of circumferentially spaced screws 20 which, in the embodiment illustrated, extend through holes 21 in the flange 16 and are threaded into mating screw holes 22 in the web 15.

The screws 20 holding the web 15 on the crankcase absorb axial separating forces, while radial forces, such as from the explosion loads, are taken up in shear by the spiral threads 18 and 19.

Adjustment for obtaining any desired radial fit between the mating threads 18 and 19 is effected easily and quickly by turning the web 15 with respect to the flange 16 of crankcase shell 10 in the spiral course of the threads. If the web is turned with respect to the shell by an amount equal to the distance between two adjacent screw holes, the fit between the threads 18 and 19 will be changed by an amount equal to the pitch of the threads divided by the number of holes.

It is to be understood that the foregoing example is only illustrative and that the invention is capable of various modifications and adaptations within the scope of the appended claims.

What is claimed is:

1. In an internal combustion engine, a crankcase, a removable web adapted to be secured thereto, cooperating spiral threads on the adjacent surfaces of said crankcase and said web permitting adjustment therebetween in the spiral course of said threads, and means for securing said web on said crankcase in any adjusted position.

2. In an internal combustion engine, a crankcase, a removable web adapted to be secured to said crankcase, a bearing carried by said web, a crankshaft journaled in said bearing, cooperating spiral threads on the adjacent surfaces of said crankcase and said web permitting said web to be adjusted about said crankcase in the spiral course of said threads, and means for securing said web on said crankcase in any adjusted position.

3. In an internal combustion engine, a crankcase, a removable web adapted to be secured to said crankcase, a bearing carried by said web, a crankshaft journaled in said bearing, cooperating intermeshing flat spiral threads on the adjacent surfaces of said crankcase and said web to permit said web to be adjusted about said crankcase in the spiral course of said threads, and means for securing said web on said crankcase in any adjusted position.

4. In an internal combustion engine, a crankcase, a removable web adapted to be secured to said crankcase, a bearing carried by said web, a crankshaft journaled in said bearing, cooperating intermeshing flat spiral threads on the adjacent surfaces of said crankcase and said web disposed in a plane normal to said crankshaft and permitting said web to be adjusted about said crankcase in the spiral course of said threads, and means for securing said web on said crankcase in any adjusted position.

5. In an internal combustion engine, a crankcase having an annular flange, a removable web adapted to be secured to said flange, a bearing carried by said web, a crankshaft journaled in said bearing, cooperating intermeshing flat spiral threads on the adjacent surfaces of said flange and said web disposed in a plane normal to said crankshaft and permitting said web to be adjusted about said flange in the spiral course of said threads, and means for securing said web on said flange in any adjusted position.

6. In an internal combustion engine, a crankcase having an annular flange, a removable web adapted to be secured to said flange, a bearing carried by said web, a crankshaft journaled in said bearing, cooperating intermeshing flat spiral threads on the adjacent surfaces of said flange and said web disposed in a plane normal to said crankshaft and permitting said web to be turned about said flange in the spiral course of said threads, said flange and said web containing series of circumferentially spaced mating holes, and means engageable in said mating holes to secure said web on said flange and absorb axial separating forces.

7. In an internal combustion engine, a crankcase having an annular flange, a removable web of circular cross-section adapted to be secured to said flange, a bearing carried by said web, a crankshaft journaled in said bearing, cooperating intermeshing flat spiral threads on the adjacent surfaces of said flange and said web disposed in a plane normal to said crankshaft and permitting said web to be turned about said flange in the spiral course of said threads, said flange and said web containing series of circumferentially spaced mating screw holes, and screws secured in said mating screw holes to secure said web on said flange and absorb axial separating forces.

GILMOURE N. COLE.